(12) United States Patent
Celest (10) Patent No.: US 11,365,004 B1
(45) Date of Patent: Jun. 21, 2022

(54) WATER-SCOOPING PROBE (71) Applicant: Fred Celest, Van Nuys, CA (US)

(72) Inventor: Fred Celest, Van Nuys, CA (US)

( * ) Notice: Subject to any disclaimer, the term of this patent is extended or adjusted under 35 U.S.C. 154(b) by 813 days.

(21) Appl. No.: 16/262,920

(22) Filed: Jan. 31, 2019

(51) Int. Cl.
B64D 1/16 (2006.01)
B64D 1/22 (2006.01)
A62C 3/02 (2006.01)

(52) U.S. Cl.
CPC .............. B64D 1/22 (2013.01); A62C 3/0228 (2013.01)

(58) Field of Classification Search
CPC .. B64D 1/22; B64D 47/00; B64D 1/16; A62C 3/0228
See application file for complete search history.

(56) References Cited

U.S. PATENT DOCUMENTS

| 3,289,415 | A | 12/1966 | Merrill |
| 3,661,211 | A | 5/1972 | Powers |
| 3,897,829 | A | 8/1975 | Eason |
| 4,090,567 | A | 5/1978 | Tomlinson |
| 4,474,350 | A | 10/1984 | Hawkshaw |
| 6,209,593 | B1 * | 4/2001 | Nichols, Sr. ............. B64D 1/16 141/2 |
| 6,644,595 | B2 * | 11/2003 | Ramage ................... B64D 1/22 169/53 |
| 6,688,402 | B1 | 2/2004 | Wise |
| 6,874,734 | B2 | 4/2005 | Ramage |
| 7,690,600 | B2 | 4/2010 | Olive |
| 9,327,149 | B2 | 5/2016 | Lemke |
| 9,840,326 | B2 * | 12/2017 | Stupakis ................. B64C 39/02 |
| 9,908,622 | B2 | 3/2018 | Doten |
| 9,957,047 | B2 | 5/2018 | Benedik |
| 10,046,186 | B2 | 8/2018 | Doten |
| 11,008,100 | B1 * | 5/2021 | Richardson ........ A62C 99/0072 |
| 2002/0084383 | A1 * | 7/2002 | Maeda ..................... B64D 1/16 244/136 |
| 2002/0125016 | A1 | 9/2002 | Cofield |
| 2003/0146005 | A1 | 8/2003 | Brooke |
| 2007/0164162 | A1 * | 7/2007 | Olive ....................... B64D 1/16 244/136 |
| 2009/0126951 | A1 | 5/2009 | Baek |

(Continued)

FOREIGN PATENT DOCUMENTS

| CA | 2297296 A1 | 5/2001 |
| CA | 2790131 A1 | 9/2011 |

(Continued)

Primary Examiner — Mark T Le
(74) Attorney, Agent, or Firm — Quickpatents, LLC; Kevin Prince (57) ABSTRACT An expandable probe for filling a water tank in an aircraft from a body of water includes an inflatable hose having a proximal end fixed with a housing in the aircraft, a distal end fixed with a scooping head, an elastomeric internal conduit, and an inflatable bladder substantially surrounding the conduit. The conduit has a proximal end in communication with the water tank of the aircraft and a distal end fixed with a water scoop of the scooping head. An air supply is adapted to inflate and extend the inflatable hose to an extended configuration extending outside an open rear end of the housing below the lower side of the aircraft. Lowering the aircraft allows the scooping head to contact the body of water such that water enters the scoop and travels up the conduit to the water tank.

20 Claims, 8 Drawing Sheets (56) References Cited

U.S. PATENT DOCUMENTS

| | | |
|---|---|---|
| 2010/0178176 A1 | 7/2010 | Kenyon |
| 2011/0192617 A1 | 8/2011 | Saurina Casals |
| 2013/0056230 A1* | 3/2013 | Lemke ................. A62C 3/0242 |
| | | 169/44 |
| 2017/0328814 A1 | 11/2017 | Castendyk |

FOREIGN PATENT DOCUMENTS

| | | |
|---|---|---|
| CA | 2887714 A1 | 8/2015 |
| CN | 105771115 A | 7/2016 |
| JP | 2004500278 A | 1/2004 |
| WO | 2010028538 A1 | 3/2010 |

\* cited by examiner

WATER-SCOOPING PROBE

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to aerial firefighting equipment, and more particularly to an inflatable water scooping probe.

BACKGROUND

Firefighting water collecting devices exist mainly for helicopters. Some have tried to adapt them to fixed-wing aircraft but these systems prove inadequate and simply do not work at the high speeds airplane require, greater than 100 knots. Telescoping metal tubes are too heavy, too cumbersome, and can break or bend under high speed when impacting a water surface; flexible hoses trail into the relative wind and bounce on the water surface which becomes 'hard' at high speed.

As a fixed-wing plane loses considerable amount of time returning to an airport to reload, it is much more efficient fighting a fire when the plane can scoop water. Water scoopers, fixed-wing planes that collect water by scooping the water surface with a scoop attached to the airframe or pontoons, must contact the water surface with their fuselage or pontoons. This present several problems:
1. It is dangerous for the plane to touch the water because of potential submerged objects, sand bars and swell that can cause damage to the plane.
2. The fuselage becomes 'contaminated' by the body of water and cannot scoop into another separate body of water, as it would contaminate the next body of water. The EPA (Environmental Protection Agency) forbids scoopers from contacting more than one body of water without thoroughly washing the plane first on the ground at an airport.
3. Aircraft design for scoopers is a 'boat' design or the plane must be fitted with floating pontoons which causes significant aerodynamic drag, adds considerable weight, and hence is less efficient and more fuel is used. If not a boat design, the plane is fitted with pontoons which makes the plane even more slow, heavy and dangerous on water.

Therefore, there is a need for a device that allows a fixed-wing aircraft to efficiently scoop water from a body of water to fill a water tank for firefighting. Such a needed invention would reduce the hazard of collecting water to the aircraft and would be easy to deploy and retract. Such a needed device would inhibit cross-contamination of harmful organisms between different bodies of water that are utilized. The present invention accomplishes these objectives.

SUMMARY OF THE INVENTION

The present device is an expandable probe for filling a water tank in an aircraft while flying over a body of water. The aircraft has a lower side and at least a power source, and is primarily for fire-fighting fixed-wing aircraft.

A housing is fixed with the aircraft and open at a rear end thereof. An inflatable hose has a proximal end fixed with the housing, a distal end, an elastomeric internal conduit, and an inflatable bladder substantially surrounding the internal elastomeric conduit. The internal elastomeric conduit has a proximal end in communication with the water tank of the aircraft and a distal end.

An air supply is fixed with the housing and is in selective fluid communication with the inflatable bladder of the inflatable hose. The air supply is further adapted to extend the inflatable hose by opening an air valve to inflate the inflatable bladder from a retracted configuration, fully contained within the housing, to an extended configuration extending outside the open rear end of the housing below the lower side of the aircraft. Preferably the air supply is a pressurized tank of air having an air compressor connected with the power source. The air compressor is adapted to maintain a minimum air pressure within the pressurized tank of air. Alternately the air supply is an air conduit connected with an existing engine bleed air source of the aircraft.

A substantially rigid scooping head is fixed with the distal end of the inflatable hose at a front side of the scooping head. The scooping head further includes a top, a bottom, a rear, and two sides. The bottom of the scooping head includes a water inlet such as a "NACA scoop" (a type of low-drag air inlet design, originally developed by the National Advisory Committee for Aeronautics) proximate the front side of the scooping head and that terminates at the distal end of the internal conduit of the inflatable hose. The bottom of the scooping head further includes at least one downward-urging foil, which when subject to a flow of water therearound, a result of the scooping head being lowered into the body of water by the flying aircraft, causes a downward force on the scooping head.

The sides of the scooping head further include at least another of the downward-urging downward foils disposed laterally away therefrom, preferably two such additional downward foils as illustrated, and at least one upwardly-urging foil projection laterally away therefrom for orientation stability of the scooping head in the body of water.

Preferably the inflatable hose is fixed at the distal end thereof with the scooping head at a plurality of attachment points formed at the front of the scooping head. The attachment points each have a surface area adapted for receiving an adhesive and for fixing with the inflatable hose.

As such, in use, when the air supply fills the inflatable bladder of the inflatable hose, the inflatable hose extends downwardly below the aircraft to present the scooping head to the body of water. Lowering the aircraft allows the scooping head to contact the body of water, the downward-urging foils drawing the scooping head at least partially under the water while the upward-urging foil orients and stabilizes the location of the scooping head on the body of water. Water from the body of water enters the NACA scoop and travels up the conduit to the water tank.

When the water tank is sufficiently full of water, the air valve is closed and air within the inflatable bladder is pressed or pressured to escape the inflatable bladder to deflate the inflatable hose, typically through small apertures or gaps between panels of the air-tight layers. The elastomeric internal conduit presses air out of the inflatable bladder to return the inflatable hose to the retracted position within the housing. In some embodiments the air supply is adapted for creating, in a reverse mode, a vacuum to pull air from within the inflatable bladder to empty the inflatable bladder and cause the inflation hose to collapse into the retracted configuration.

Preferably the inflatable bladder is made with an expandable drop-stitch material that includes two carbon fiber woven fabric layers each having a plurality of nylon strings stretched between two inner surfaces of each carbon fiber woven fabric layer, or the like. Two air-tight layers are adhered to outers surfaces of each carbon fiber woven fabric layers. Alternately the inflatable bladder is made with an expandable, flexible honeycomb material.

The present device allows a fixed-wing aircraft to efficiently scoop water from a body of water to fill a water tank for firefighting. The present invention reduces the hazard of collecting water to the aircraft and is easy to deploy and retract. further, the present device inhibits cross-contamination of harmful organisms between different bodies of water that are utilized. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-4 illustrate an expandable probe 10 for filling a water tank 28 in an aircraft 20 while flying over a body of water 15. The aircraft 20 has a lower side 22 and at least a power source 26. The expandable probe 10 of the present invention is envisioned primarily for fire-fighting fixed-wing aircraft such as reconfigured DC-10 Tankers, Lockheed P2V Neptune planes, or the like.

Figure 12:
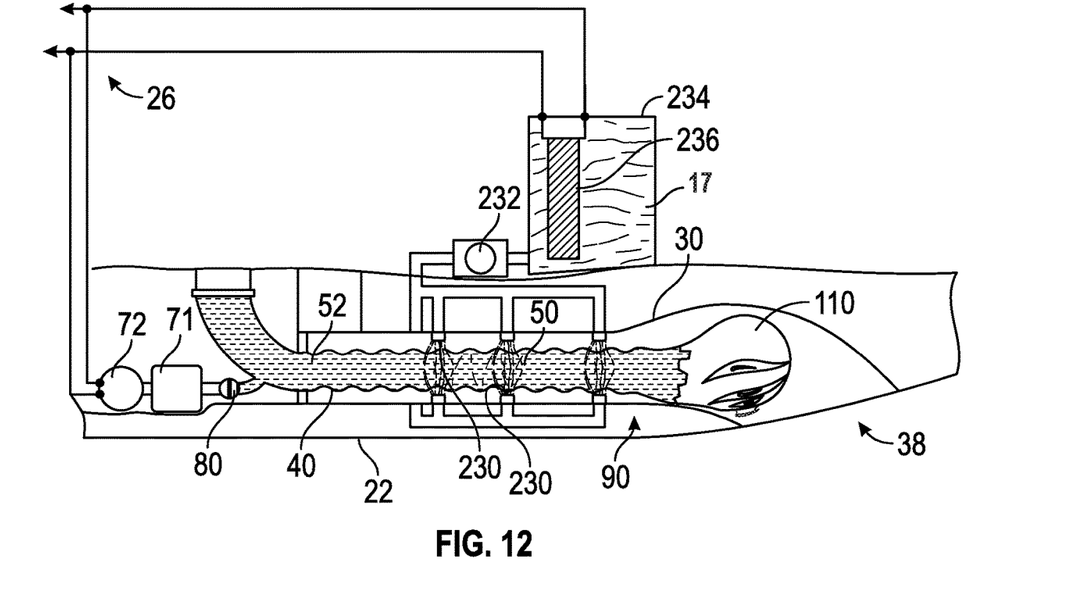
FIG. 12 is a diagram of a housing of the invention, illustrating sanitizing jets for cleaning the inflatable hose as it retracts into the housing.

A housing 30 is fixed with the aircraft 20 and open at a rear end 38 thereof. One or more housing doors (not shown) can be included to selectively seal the open rear end 38 when the expandable probe 10 is not in use, typically by a pilot or an operator local to the housing 30 in the aircraft 20. The housing 30 may include a plurality of sanitizing jets 230 (FIG. 12) in fluid communication with a fluid pump 232 connected with the power source 26 and a fluid reservoir 234 adapted to receive a cleaning solution 17. The fluid pump 232 can be selectively activated, again by a pilot or a local operator, to spray the cleaning solution 17 onto the expandable probe 10 as it retracts into the housing 30, so as to sanitize the expandable probe 10 and prevent cross-contamination of organisms between different bodies of water 15. An optional heating element 236 in or on the fluid reservoir 234 and connected with the power source 26 of the aircraft 20 may be included to heat the cleaning solution 17 before or while spraying, to further enhance the sanitization effect of the cleaning solution 17.

An inflatable hose 40 has a proximal end 42 fixed with the housing 30, a distal end 48, an elastomeric internal conduit 50, and an inflatable bladder 60 substantially surrounding the internal elastomeric conduit 50. The internal elastomeric conduit 50 has a proximal end 52 in communication with the water tank 28 of the aircraft 20 and a distal end 58. The inflatable hose 40 is preferably of the type that can fold on itself and accumulate into a relatively small space when compared to its length when extended.

Figure 1:
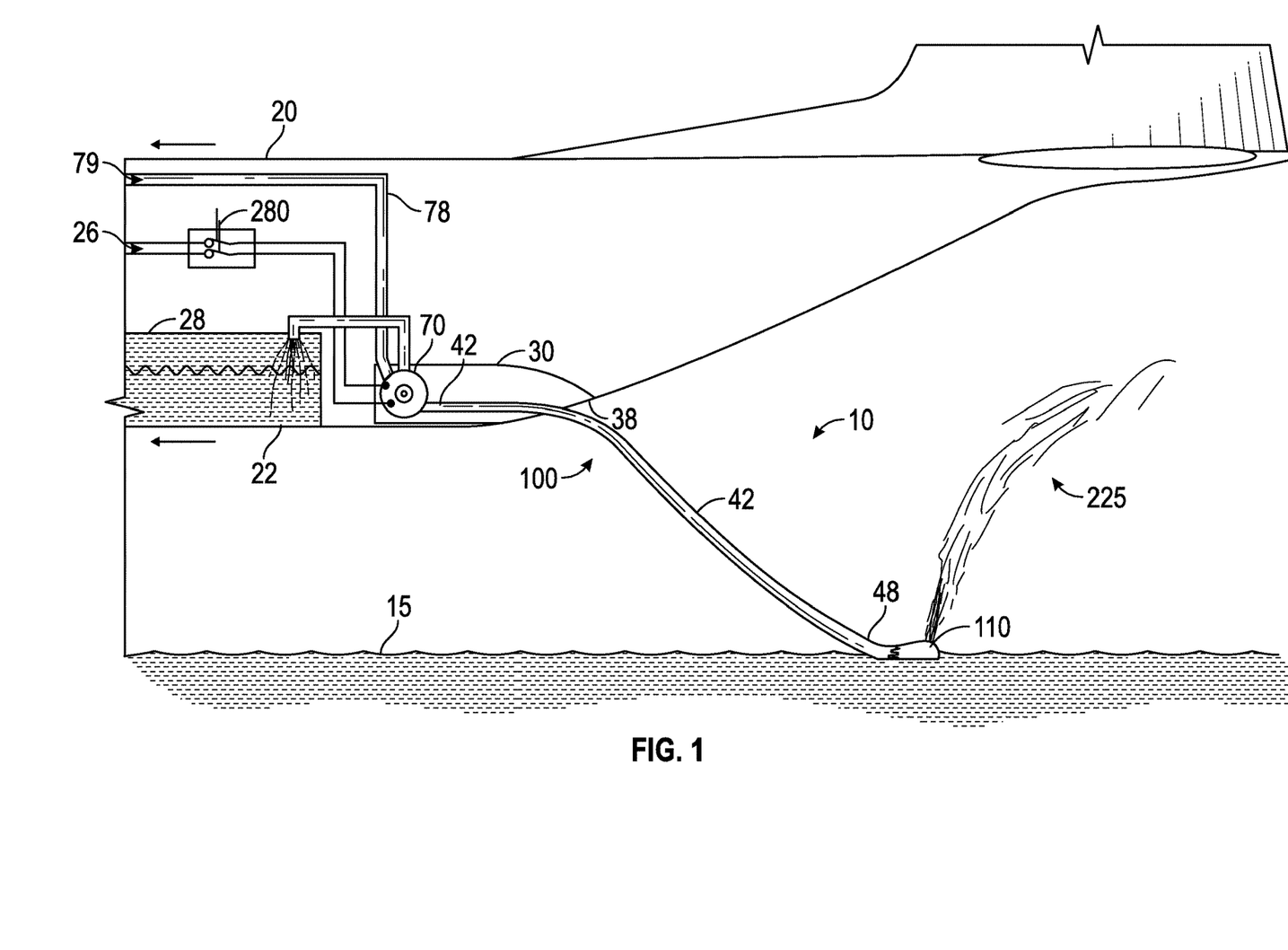
FIG. 1 is a side elevational diagram of the invention as deployed from an aircraft into a body of water.
Figure 2:
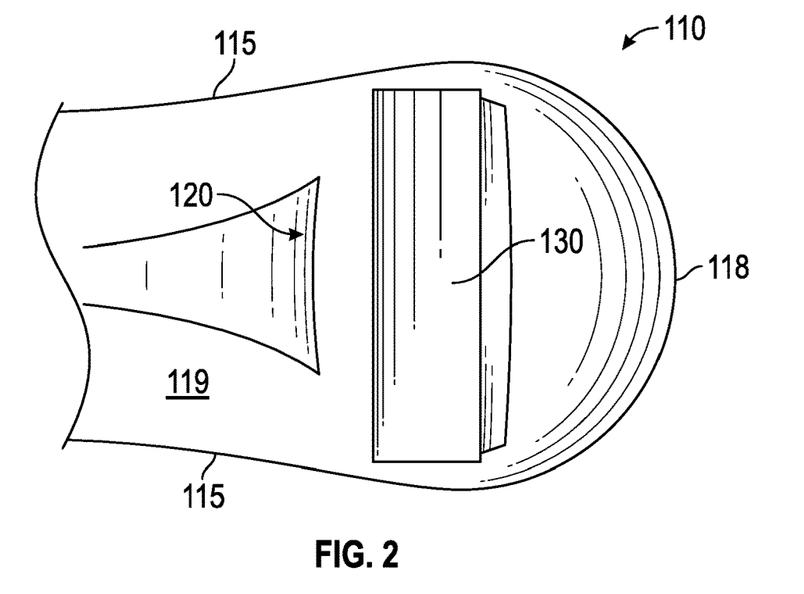
FIG. 2 is a partial bottom plan view of a scooping head of the invention.
Figure 3:
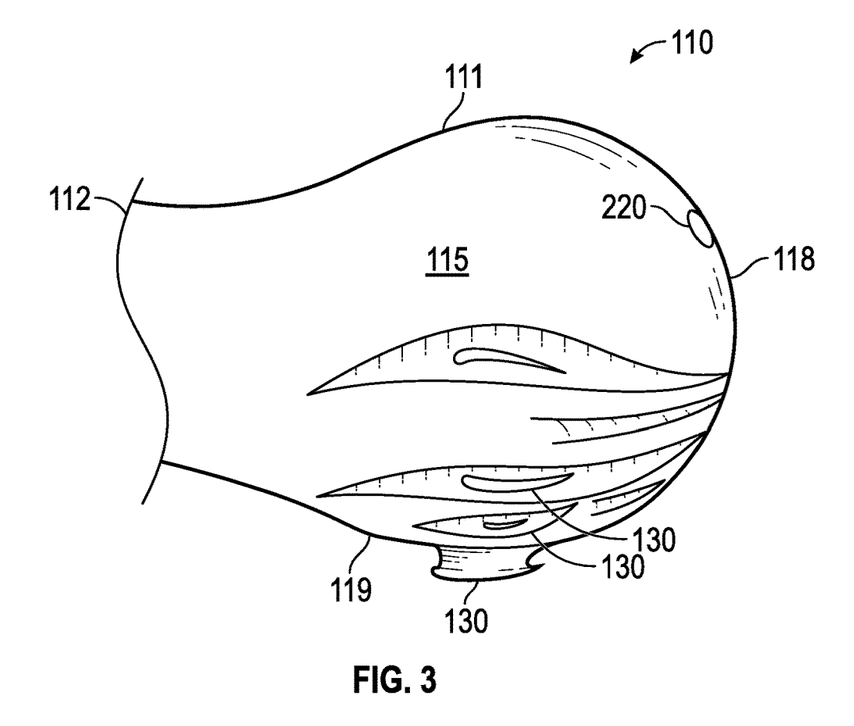
FIG. 3 is a partial side elevational view of the scooping head.
Figure 4:
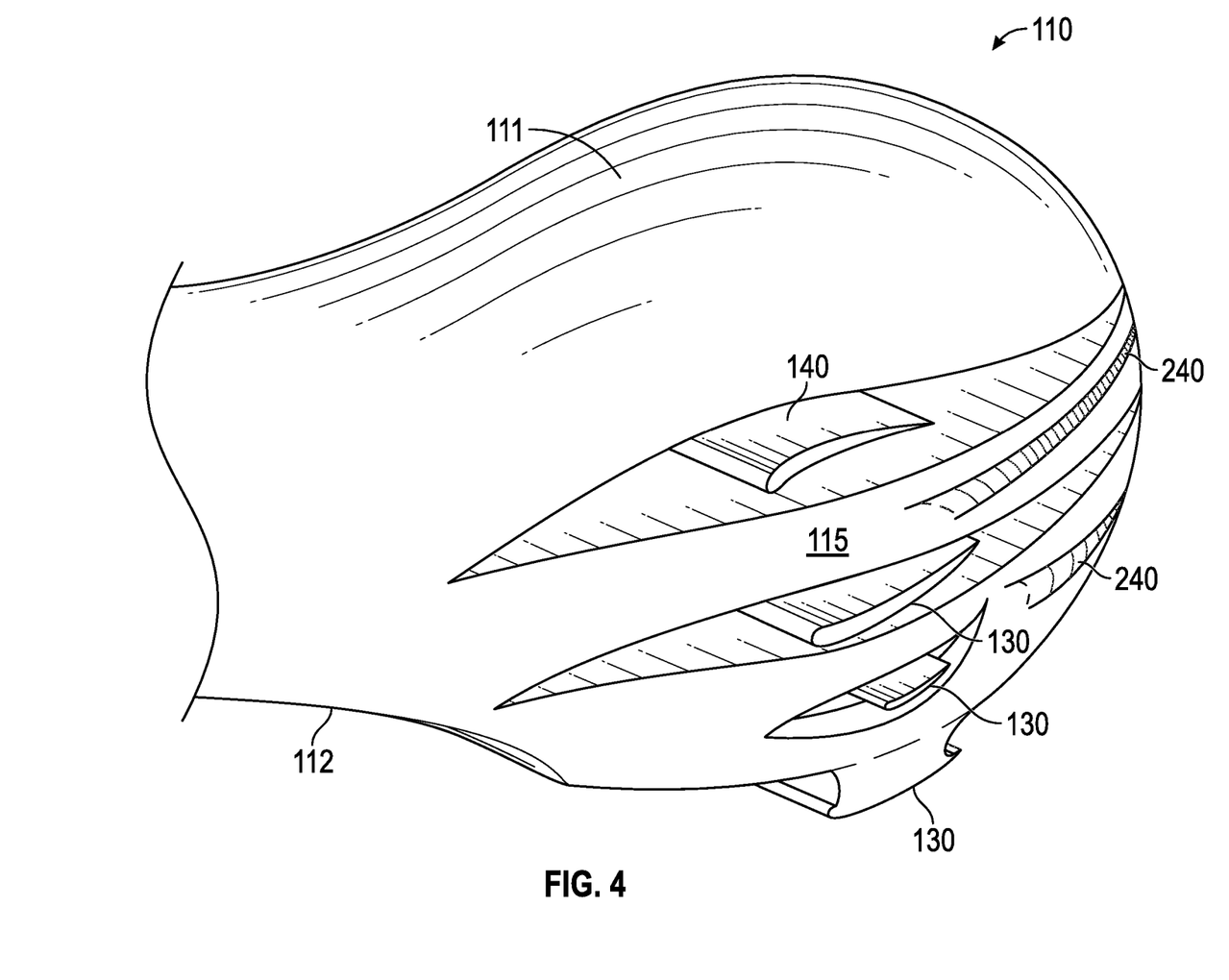
FIG. 4 is a partial perspective view of the scooping head.

An air supply 70 is fixed with the housing 30 and is in selective fluid communication with the inflatable bladder 60 of the inflatable hose 40. The air supply 70 is further adapted to extend the inflatable hose 40 by opening an air valve 80 to inflate the inflatable bladder 60 from a retracted configuration 90, fully contained within the housing 30, to an extended configuration 100 extending outside the open rear end 38 of the housing below the lower side 22 of the aircraft 20 (FIG. 1). Preferably the air supply 70 is a pressurized tank 71 of air having an air compressor 72 connected with the power source 26. The air compressor 72 is adapted to maintain a minimum air pressure within the pressurized tank of air 71. Alternately the air supply 70 is an air conduit 78 connected with an existing engine bleed air source 79 of the aircraft 20. In either case the air supply 70 provides sufficient air pressure to inflate the inflatable hose 40 so that the inflatable hose 40 can withstand the wind speeds associated with aerodynamic flight and still maintain a rigid, stable platform.

A substantially rigid scooping head 110 is fixed with the distal end 48 of the inflatable hose 40 at a front side 112 of the scooping head 110. The scooping head 110 further includes a top 111, a bottom 119, a rear 118, and two sides 115. The bottom 119 of the scooping head 110 includes a water inlet 120 such as a "NACA scoop" or an "NACA duct" (a type of low-drag air inlet design, originally developed by the National Advisory Committee for Aeronautics) proximate the front side 112 of the scooping head 110 and that terminates at the distal end 58 of the internal conduit 50 of the inflatable hose 40. The bottom 119 of the scooping head 110 further includes at least one downward-urging foil 130, which when subject to a flow of water therearound, a result of the scooping head 110 being lowered into the body of water 15 by the flying aircraft 20, causes a downward force on the scooping head 110.

The sides 115 of the scooping head 110 further include at least another of the downward-urging downward foils 130 disposed laterally away therefrom, preferably two such additional downward foils 130 as illustrated, and at least one upwardly-urging foil projection 140 laterally away therefrom for orientation stability of the scooping head 110 in the body of water 15. Further, the two sides 115 and rear 118 of the scooping head 110 each may further include at least one strake 240 (FIG. 4) formed therein for facilitating aquadynamic flow of water around the foils 130,140 and the scooping head 110, further increasing stability of the scooping head 110 in the flow of water 15.

Figure 5:
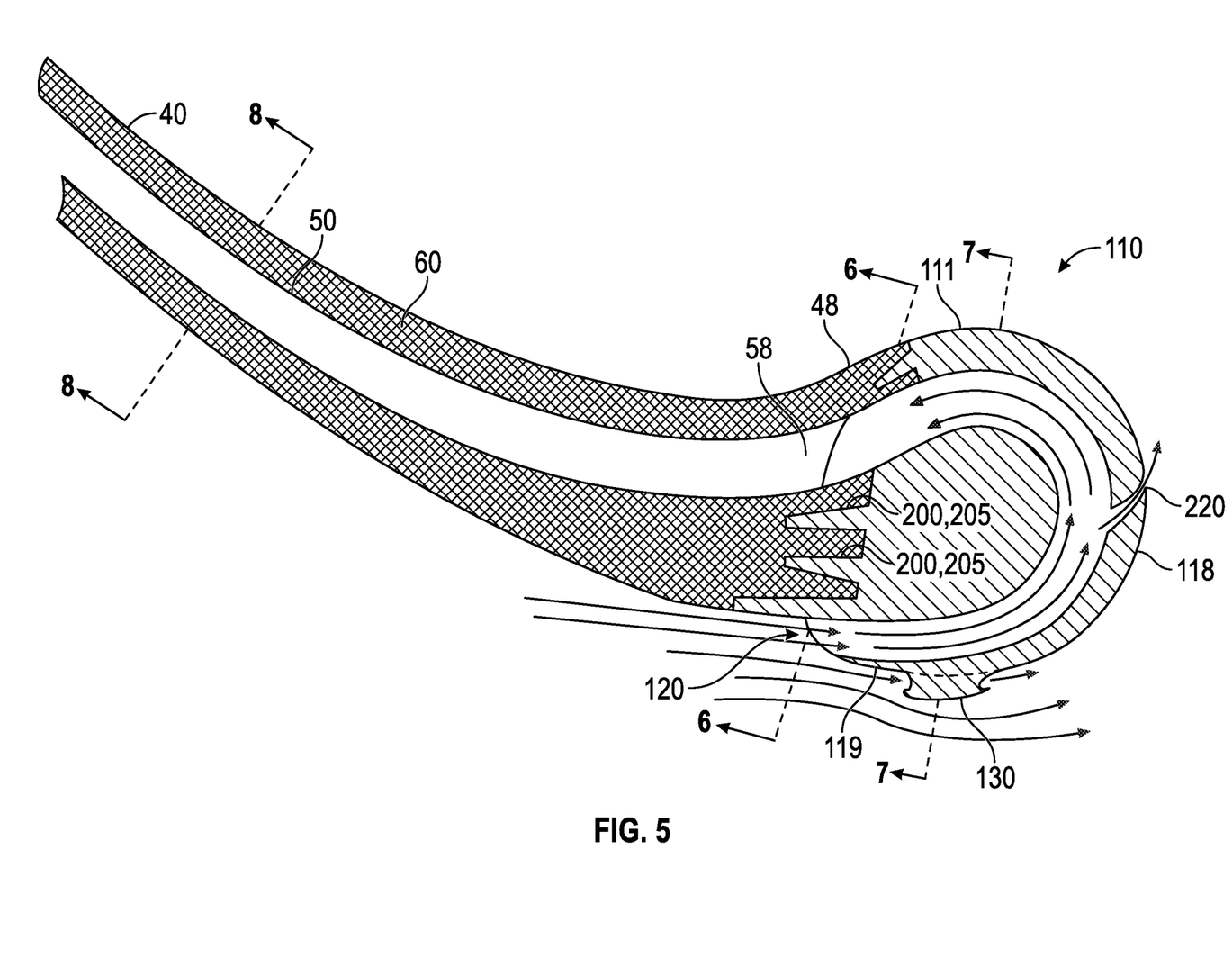
FIG. 5 is a longitudinal cross-section of a distal end of an inflatable hose and the scooping head, showing water flows within the scooping head.

The rear 118 of the scooping head 110 preferably includes at least one spout aperture 220 (FIGS. 3 and 5) in fluid communication with the NACA scoop 120. As such a portion of the water entering the NACA scoop 120 is projected upward out of the spout aperture 220 to provide a visual feedback spout 225 (FIG. 1) indicative of the scooping head 110 being sufficiently submerged for water to be flowing through the NACA scoop 120 to fill the water tank 28.

Figure 6:
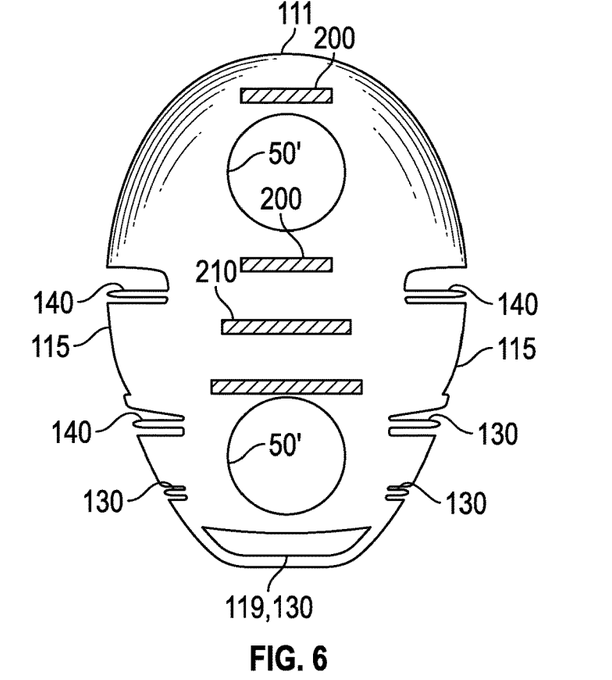
FIG. 6 is a cross-sectional view of the scooping head, taken along lines 6-6 of FIG. 5.
Figure 7:
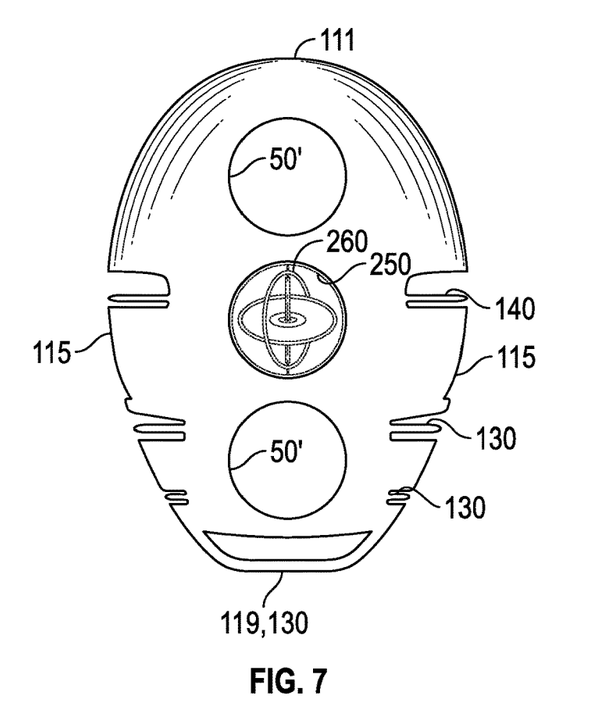
FIG. 7 is a cross-sectional view of the scooping head, taken along lines 7-7 of FIG. 5.

Preferably the inflatable hose 40 is fixed at the distal end 48 thereof with the scooping head 110 at a plurality of attachment points 200 (FIGS. 5-7) formed at the front 112 of the scooping head 110. The attachment points 200 each have a surface area 205 adapted for receiving an adhesive 210 and for fixing with the inflatable hose 40. Other clamping mechanisms (not shown), mechanical fasteners (not shown) or the like can also be used provided such can withstand the forces associated with dragging the scooping head 110 in the body of water 15 from the aircraft 20.

Figure 8:
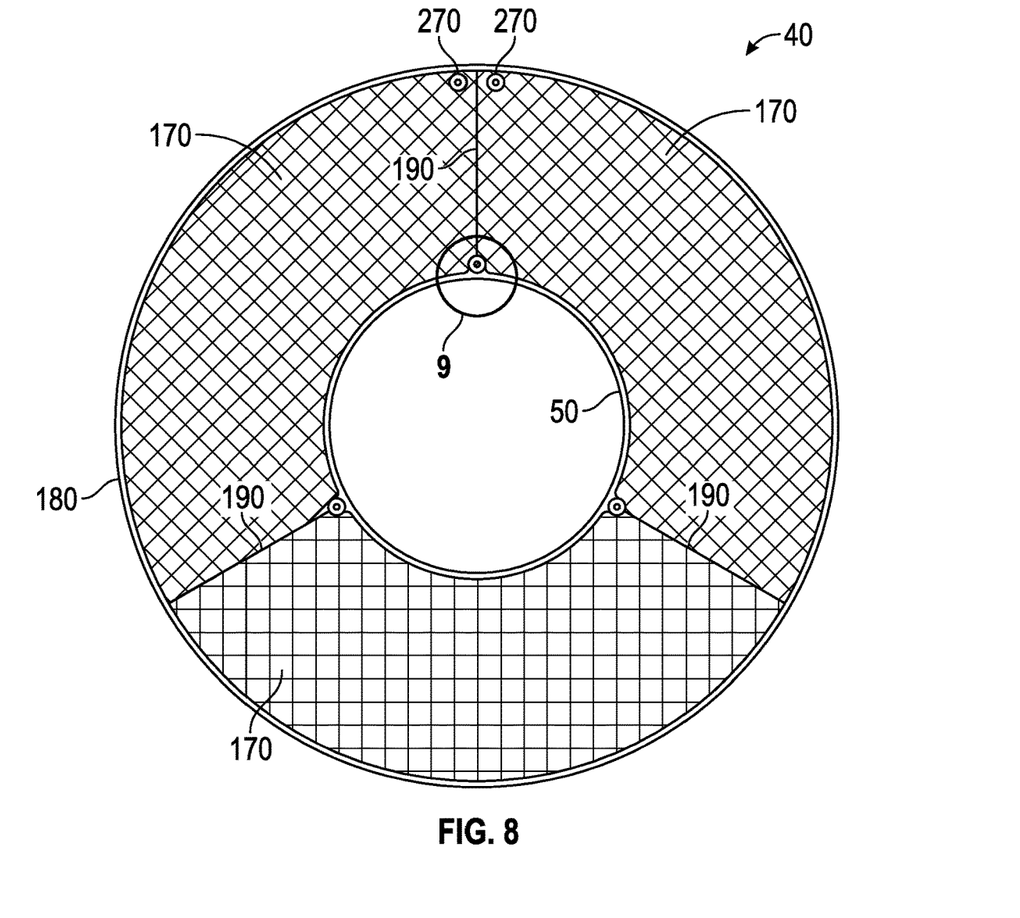
FIG. 8 is a cross-sectional view of the scooping head, taken along lines 8-8 of FIG. 5.

In some embodiments the scooping head 110 further includes, in an internal gyroscope cavity 250 formed therein, a gyroscope 260 (FIG. 7) or the like being electrically connected with the power source 26 with at least two flexible conductors 270 (FIG. 8) fixed within the inflatable hose 40. Power from the power source 26 is connected with the gyroscope 260 whenever the inflatable hose 40 is in the extended configuration 100. Such a gyroscope 260 serves to further stabilize the orientation of the scooping head 110 within the water flow. Preferably an activation switch 280 (FIG. 1), when closed, opens the air valve 80 of the air supply 70 and provides power to the gyroscope 260. When the activation switch 280 is opened, the air valve 80 of the air supply 70 closes and power ceases to the gyroscope 260.

As such, in use, when the air supply 70 fills the inflatable bladder 60 of the inflatable hose 40, the inflatable hose 40 extends downwardly below the aircraft 20 to present the scooping head 110 to the body of water 15. Lowering the aircraft 20 allows the scooping head 110 to contact the body of water 15, the downward-urging foils 130 drawing the scooping head 110 at least partially under the water 15 while the upward-urging foil 140 orients and stabilizes the location of the scooping head 110 on the body of water 15. Water from the body of water 15 enters the NACA scoop 120 and travels up the conduit 50 to the water tank 28.

When the water tank 28 is sufficiently full of water, the air valve 80 is closed and air within the inflatable bladder 60 is pressed or pressured to escape the inflatable bladder 60 to deflate the inflatable hose 40, typically through small apertures or gaps between panels of the air-tight layers, which are clearly not able to be perfectly air-tight. The elastomeric internal conduit 50 presses air out of the inflatable bladder 60 to return the inflatable hose 40 to the retracted position 90 within the housing 30. In some embodiments the air supply 70 is adapted for creating, in a reverse mode, a vacuum to pull air from within the inflatable bladder 60 to empty the inflatable bladder 60 and cause the inflatable hose 40 to collapse into the retracted configuration 90. Alternately a deflation valve (not shown) can be included in communication with the air bladder 60 to open the air bladder 60 to ambient air outside of the air bladder 60 to aid in the deflation of the inflatable hose 40.

Figure 10:
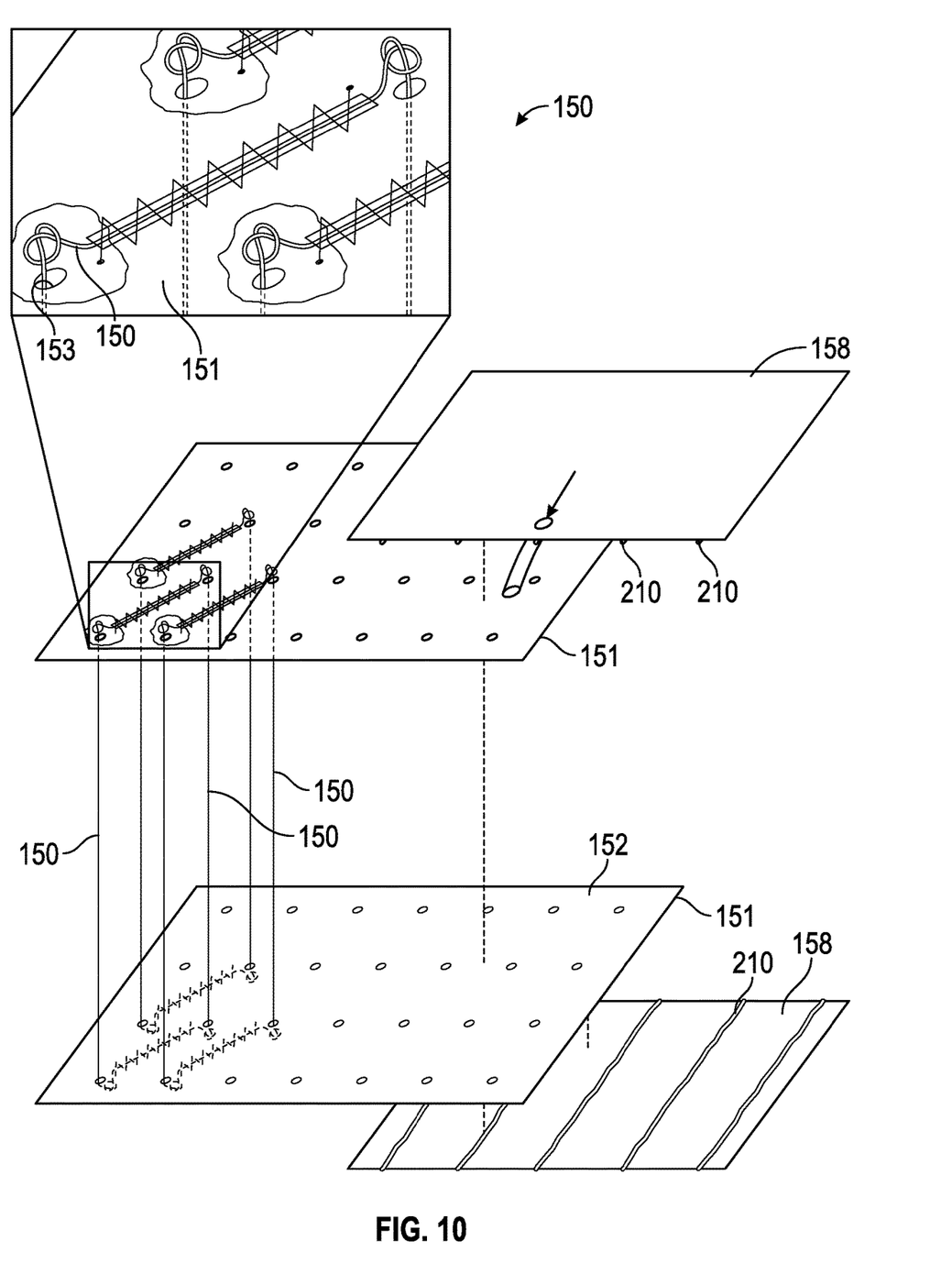
FIG. 10 is an exploded perspective diagram of a drop-stitch material of one embodiment of the inflatable hose.
Figure 11:
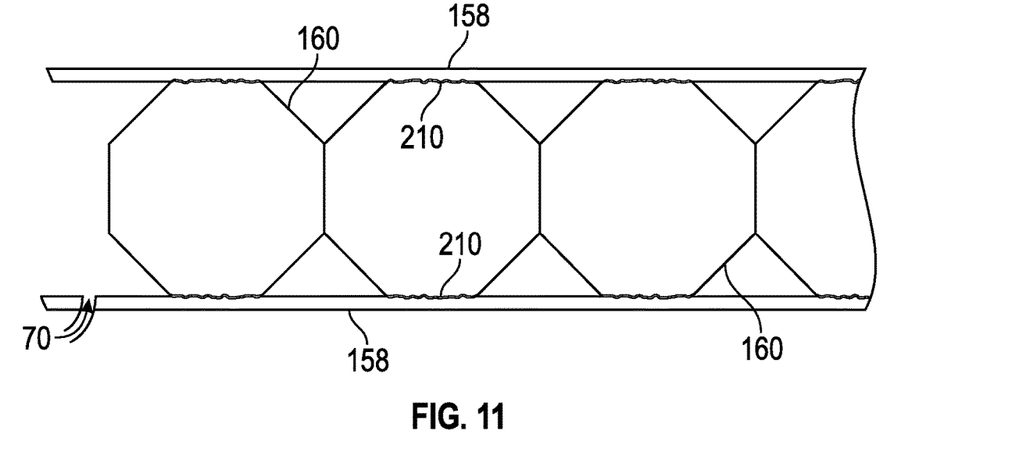
FIG. 11 is a diagram of an alternate honeycomb material of another embodiment of the inflatable hose.

Preferably the inflatable bladder 50 is made with an expandable drop-stitch material 150 (FIG. 10) that includes two carbon fiber woven fabric layers 151 each having a plurality of nylon strings 155 stretched between two inner surfaces 152 of each carbon fiber woven fabric layer 151, or the like. Two air-tight layers 158 are adhered to outers surfaces of each carbon fiber woven fabric layers 152. Alternately the inflatable bladder 60 is made with an expandable, flexible honeycomb material 160 (FIG. 11) having honeycomb-shaped inner sections that are perforated to allow air flow therethrough, yet still support the inflatable bladder 60 in a rigid condition when inflated.

Figure 9:
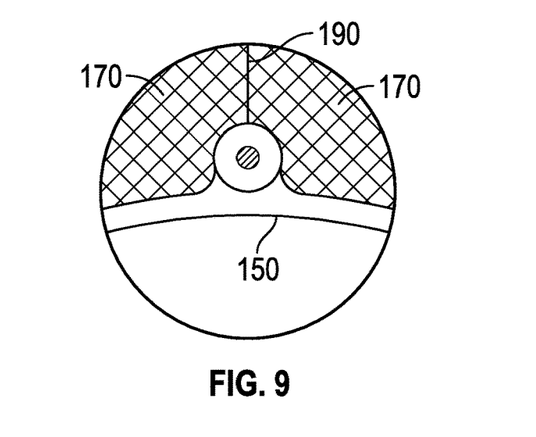
FIG. 9 is a partial enlarged cross-sectional view taken along line 9 of FIG. 8.

In some embodiments the inflatable bladder 60 comprises three separate air chambers 170 (FIGS. 8 and 9) that are each longitudinally-aligned with the internal conduit 50 and contained within a flexible fabric sheath 180. A plurality of elastomeric cords 190 are fixed between each air chamber 170 between the fabric sheath 180 and the internal conduit 50 for urging the collapse of the inflatable hose 40 to the retracted configuration 90.

While a particular form of the invention has been illustrated and described, it will be apparent that various modifications can be made without departing from the spirit and scope of the invention. For example, other forms of the inflatable bladder 60 may be utilized, with different materials or constructions. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An expandable probe for filling a water tank in an aircraft while flying over a body of water, the aircraft having a lower side and at least a power source, comprising:
    a housing fixed with the aircraft and open at a rear end thereof;
    an inflatable hose having a proximal end fixed with the housing, a distal end, an internal elastomeric conduit, and an inflatable bladder substantially surrounding the internal elastomeric conduit; the internal conduit having a proximal end in communication with the water tank of the aircraft and a distal end;
    an air supply fixed with the housing, in selective fluid communication with the inflatable bladder of the inflatable hose, and adapted to extend the inflatable hose by opening an air valve to inflate the inflatable bladder from a retracted configuration, fully contained within the housing, to an extended configuration extending outside the open rear end of the housing below the lower side of the aircraft;
    a substantially rigid scooping head fixed with the distal end of the inflatable hose at a front of the scooping head, the scooping head further including a top, bottom, rear, and two sides, the bottom of the scooping head including an NACA scoop proximate the front of the scooping head that terminates at the distal end of the conduit of the inflatable hose, the bottom of the scooping head further including at least one downward-urging foil, the sides of the scooping head further including at least another of the downward-urging foil projecting laterally away therefrom and at least one upwardly-urging foil projecting laterally away therefrom;
    whereby when the air supply fills the inflatable bladder of the inflatable hose, the inflatable hose extends downwardly below the aircraft to present the scooping head to the body of water, whereupon lowering the aircraft allows the scooping head to contact the water, the downward-urging foils adapted to draw the scooping head at least partially under the water while the upwardly-urging foil orients and stabilizes the location of the scooping head on the body of water, water from the body of water entering the NACA scoop and traveling up the conduit to the water tank; and whereby when the air valve is closed, air within the inflatable bladder is pressed to escape outward through leaks to deflate the inflatable hose, the elastomeric internal conduit pressing air out of the inflatable bladder to return the inflatable hose to the retracted position within the housing.

2. The expandable probe of claim 1 wherein the air supply is a pressurized tank of air having an air compressor connected with the power source, the air compressor adapted to maintain a minimum air pressure within the pressurized tank of air.

3. The expandable probe of claim 1 wherein the air supply is an air conduit connected with an engine bleed air source of the aircraft.

4. The expandable probe of claim 1 wherein the inflatable bladder is made with an expandable drop-stitch material that includes two carbon fiber woven fabric layers having a plurality of nylon strings stretched between two inner surfaces of each carbon fiber woven fabric layer, two air-tight layers being adhered to outer surfaces of each carbon fiber woven fabric layers.

5. The expandable probe of claim 1 wherein the inflatable bladder is made with an expandable, flexible honeycomb material.

6. The expandable probe of claim 1 wherein the inflatable bladder includes three separate air chambers each longitudinally aligned with the internal conduit and contained within a flexible fabric sheath, a plurality of elastomeric cords fixed between each air chamber between the fabric sheath and the internal conduit for facilitating collapsing of the inflatable hose to the retracted configuration.

7. The expandable probe of claim 1 wherein the inflatable hose is fixed at the distal end thereof with the scooping head at a plurality of attachment points formed at the front of the scooping head, the attachment points each having a surface area adapted for receiving an adhesive and for fixing with the inflatable hose.

8. The expandable probe of claim 6 wherein the inflatable hose is fixed at the distal end thereof with the scooping head at a plurality of attachment points formed at the front of the scooping head, the attachment points each having a surface area adapted for receiving an adhesive and for fixing with the fabric sheath of the inflatable hose.

9. The expandable probe of claim 1 wherein the rear of the scooping head includes a spout aperture in fluid communication with the NACA scoop, such that a portion of the water entering the NACA scoop is projected upward out of the spout aperture to provide a visual feedback that the scooping head is sufficiently submerged such that water is flowing through the NACA scoop.

10. The expandable probe of claim 1 wherein the air supply is adapted for creating, in a reverse mode, a vacuum to pull air from within the inflatable bladder to empty the inflatable bladder and cause the inflatable hose to collapse into the retracted configuration.

11. The expandable probe of claim 1 wherein the housing includes a plurality of sanitizing jets in fluid communication with a fluid pump connected with the power source and a fluid reservoir, the fluid reservoir adapted to receive a cleaning solution, the fluid pump selectively activated to spray the inflatable hose as it retracts into the housing with the cleaning solution.

12. The expandable probe of claim 11 wherein the fluid reservoir includes a heating element to heat the cleaning solution before or while spraying the inflatable hose, the heating element electrically connected with the power source.

13. The expandable probe of claim 1 wherein the two sides and rear of the scooping head each include at least one strake formed therein for facilitating aquadynamic flow of water around the foils and scooping head.

14. The expandable probe of claim 1 wherein the scooping head further includes, in an internal gyroscope cavity formed therein, a gyroscope electrically connected with the power source with two flexible conductors fixed within the inflatable hose, power from the power source being connected with the gyroscope whenever the inflatable hose is in the extended configuration via an activation switch, the activation switch when closed, opens the air valve of the air supply and provides power to the gyroscope.

15. An expandable probe for filling a water tank in an aircraft while flying over a body of water, the aircraft having a lower side and at least a power source, comprising:
  a housing fixed with the aircraft and open at a rear end thereof;
  an inflatable hose having a proximal end fixed with the housing, a distal end, an internal elastomeric conduit, and an inflatable bladder substantially surrounding the internal elastomeric conduit; the internal conduit having a proximal end in communication with the water tank of the aircraft and a distal end;
  the inflatable bladder having an expandable drop-stitch material that includes two carbon fiber woven fabric layers having a plurality of nylon strings stretched between two inner surfaces of each carbon fiber woven fabric layer, two air-tight layers being adhered to outer surfaces of each carbon fiber woven fabric layers;
  the inflatable bladder including three separate air chambers each longitudinally aligned with the internal conduit and contained within a flexible fabric sheath, a plurality of elastomeric cords fixed between each air chamber between the fabric sheath and the internal conduit for facilitating collapsing of the inflatable hose to the retracted configuration in the absence if air from an air supply;
  the air supply fixed with the housing, in selective fluid communication with the inflatable bladder of the inflatable hose, and adapted to extend the inflatable hose by opening an air valve to inflate the inflatable bladder from a retracted configuration, fully contained within the housing, to an extended configuration extending outside the open rear end of the housing below the lower side of the aircraft;
  the air supply being a pressurized tank of air having an air compressor connected with the power source, the air compressor adapted to maintain a minimum air pressure within the pressurized tank of air;
  a substantially rigid scooping head fixed with the distal end of the inflatable hose at a front of the scooping head, the scooping head further including a top, bottom, rear, and two sides, the bottom of the scooping head including an NACA scoop proximate the front of the scooping head that terminates at the distal end of the conduit of the inflatable hose, the bottom of the scooping head further including at least one downward-urging foil, the sides of the scooping head further including at least another of the downward-urging foil projecting laterally away therefrom and at least one upwardly-urging foil projecting laterally away therefrom, the two sides and rear of the scooping head each including at least one strake formed therein for facilitating aquadynamic flow of water around the foils and scooping head;
  the inflatable hose being fixed at the distal end thereof with the scooping head at a plurality of attachment points formed at the front of the scooping head, the attachment points each having a surface area adapted for receiving an adhesive and for fixing with the inflatable hose;
  whereby when the air supply fills the inflatable bladder of the inflatable hose, the inflatable hose extends downwardly below the aircraft to present the scooping head to the body of water, whereupon lowering the aircraft allows the scooping head to contact the water, the downward-urging foils adapted to draw the scooping head at least partially under the water while the upwardly-urging foil orients and stabilizes the location of the scooping head on the body of water, water from the body of water entering the NACA scoop and traveling up the conduit to the water tank; and whereby when the air valve is closed, air within the inflatable bladder is pressed to escape outward through leaks to deflate the inflatable hose, the elastomeric internal conduit pressing air out of the inflatable bladder to return the inflatable hose to the retracted position within the housing.

16. The expandable probe of claim 15 wherein the rear of the scooping head includes a spout aperture in fluid communication with the NACA scoop, such that a portion of the water entering the NACA scoop is projected upward out of the spout aperture to provide a visual feedback that the scooping head is sufficiently submerged such that water is flowing through the NACA scoop.

17. The expandable probe of claim 15 wherein the air supply is adapted for creating, in a reverse mode, a vacuum to pull air from within the inflatable bladder to empty the inflatable bladder and cause the inflatable hose to collapse into the retracted configuration.

18. The expandable probe of claim 15 wherein the housing includes a plurality of sanitizing jets in fluid communication with a fluid pump connected with the power source and a fluid reservoir, the fluid reservoir adapted to receive a cleaning solution, the fluid pump selectively activated to spray the inflatable hose as it retracts into the housing with the cleaning solution.

19. The expandable probe of claim 18 wherein the fluid reservoir includes a heating element to heat the cleaning solution before or while spraying the inflatable hose, the heating element electrically connected with the power source.

20. The expandable probe of claim 15 wherein the scooping head further includes, in an internal gyroscope cavity formed therein, a gyroscope electrically connected with the power source with two flexible conductors fixed within the inflatable hose, power from the power source being connected with the gyroscope whenever the inflatable hose is in the extended configuration via an activation switch, the activation switch when closed, opens the air valve of the air supply and provides power to the gyroscope.

\* \* \* \* \*